Oct. 25, 1932.  D. S. BARROWS  1,884,517
CUSHIONING MECHANISM
Filed Sept. 27, 1926   2 Sheets-Sheet 1
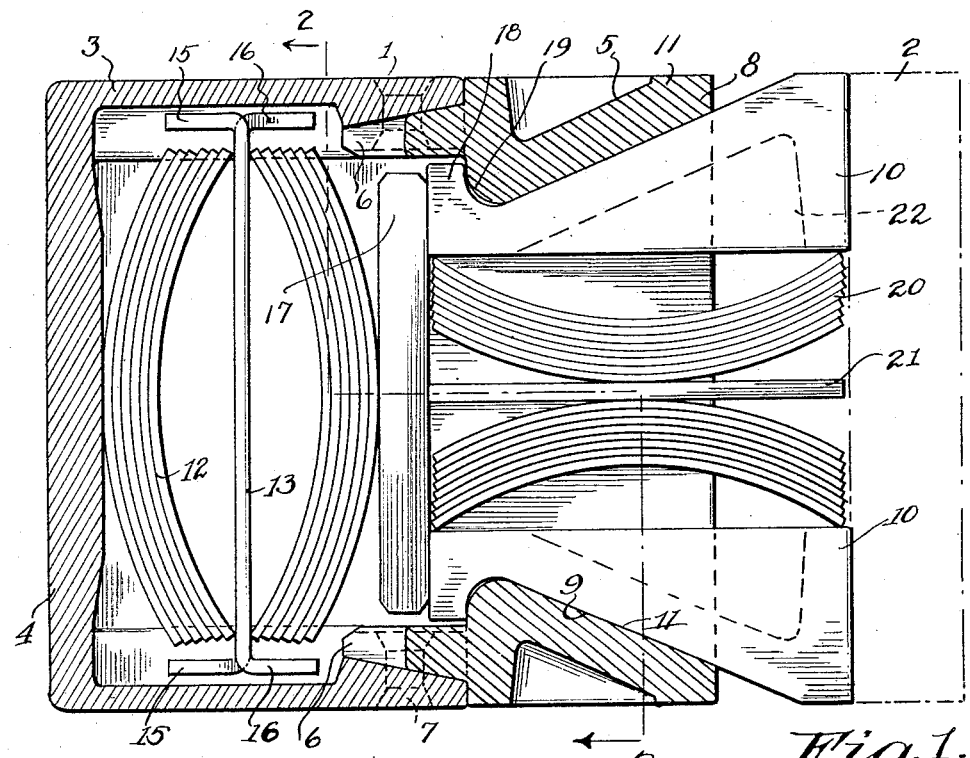
Fig. 1.
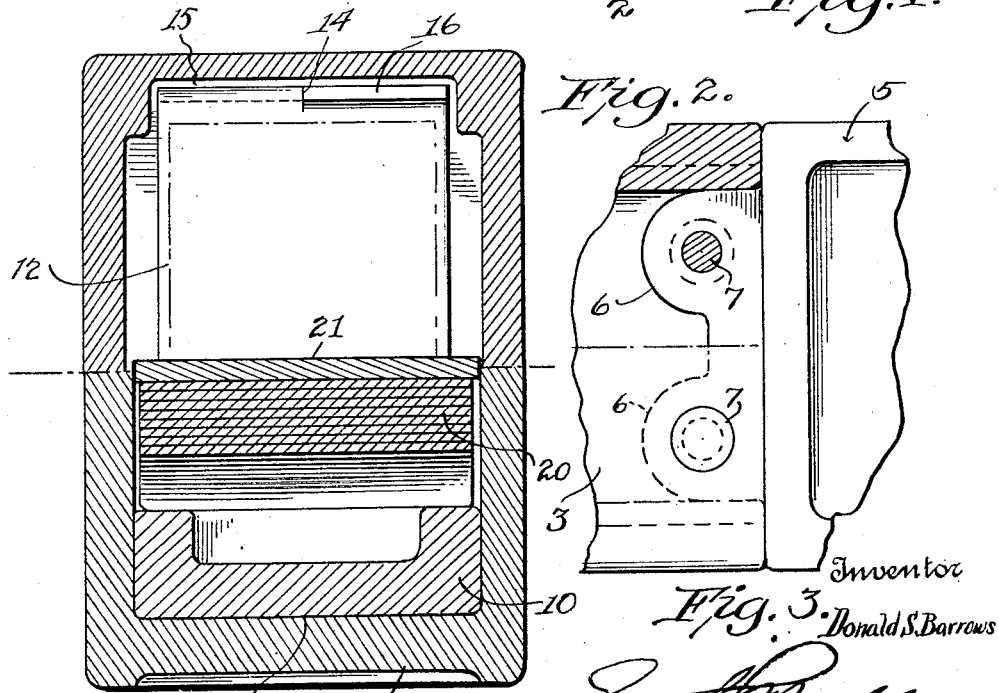
Fig. 2.
Fig. 3.
Inventor
Donald S. Barrows
his Attorney Oct. 25, 1932.    D. S. BARROWS    1,884,517
CUSHIONING MECHANISM
Filed Sept. 27, 1926    2 Sheets-Sheet 2
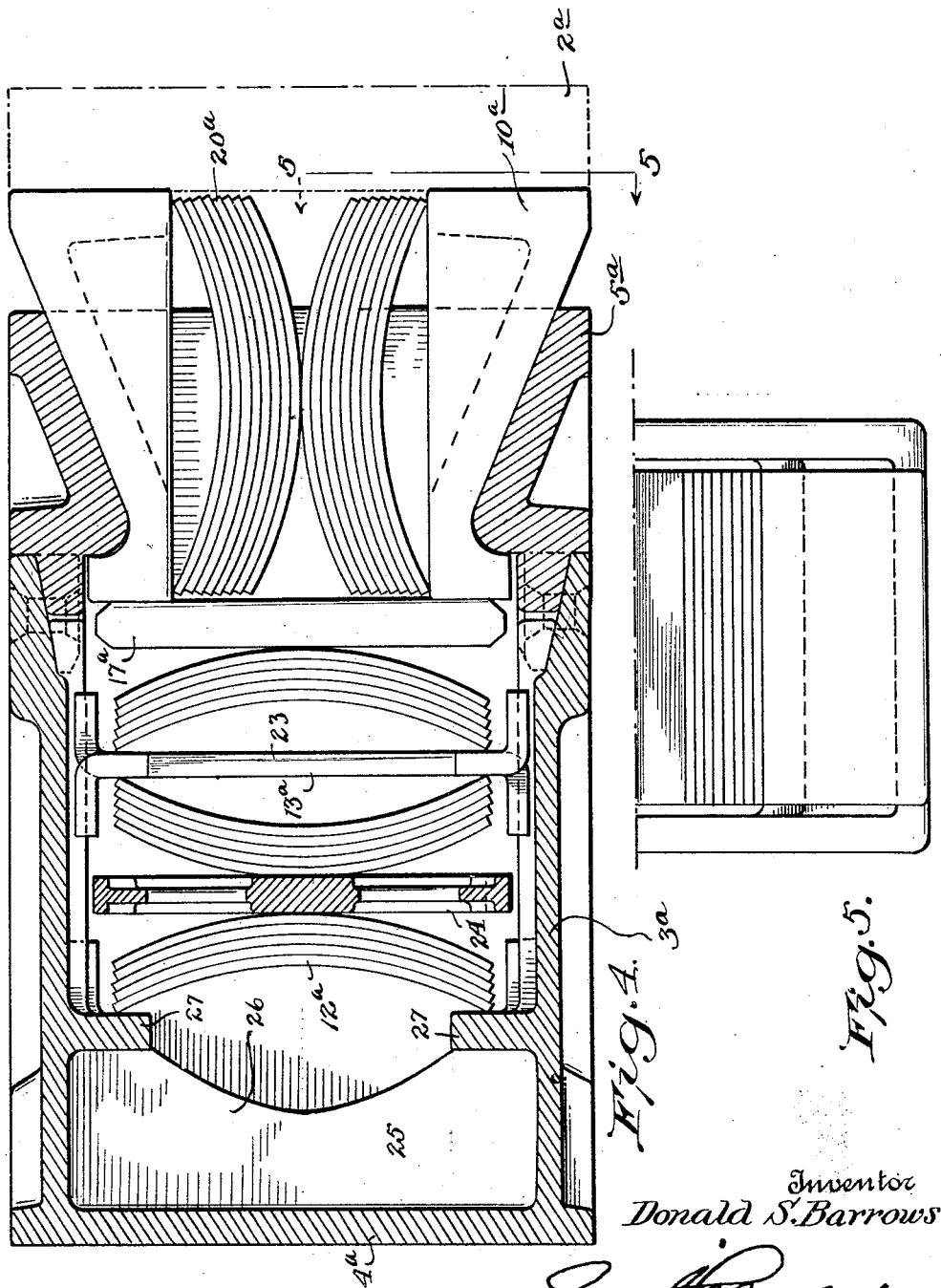
Inventor
Donald S. Barrows
his Attorney Patented Oct. 25, 1932

1,884,517

UNITED STATES PATENT OFFICE

DONALD S. BARROWS, OF ROCHESTER, NEW YORK, ASSIGNOR TO THE GOULD COUPLER COMPANY, OF NEW YORK, N. Y., A CORPORATION OF MARYLAND

CUSHIONING MECHANISM

Application filed September 27, 1926. Serial No. 138,068.

This invention relates to cushioning mechanism and, more particularly, to friction draft gears particularly adapted for application to railway cars.

The principal object of my invention, generally considered, is the provision of a friction draft gear particularly adapted for railway service, said gear being designed particularly with a view to economical production thereof in a plurality of lengths and travels, whereby it is adapted for interchanging with various gears and for fitting in draft gear pockets of various lengths.

An object of my invention is the provision of a series of friction draft gears so designed that the gears in said series may be made of different lengths with different amounts of permissible travel while, at the same time, the maximum number of identical parts for making such gears is employed to reduce the cost of manufacturing the same.

Another object of my invention is the provision of a friction draft gear comprising a casing or spring barrel formed with an interchangeable bell-mouthed portion riveted or otherwise connected thereto, said bell-mouthed portion being so constructed that it may be connected with other spring barrels of different lengths to provide gears adapted for application in pockets of varying lengths, as well as being adapted for separate replacement when worn out in service.

A further object of my invention is the provision of a friction draft gear utilizing a spring barrel or housing formed in two parts, a replaceable mouth adapted for developing frictional resistance on inclined surfaces thereof and a spring containing and length determining part, said latter part being formed with a portion holding the resilient means of the gear and, with the longer gears, the barrel is provided with a hollow extension for determining the proper length of the gear and making it unnecessary to use an additional follower or follower of abnormal length.

A still further object of my invention is the provision of a friction draft gear utilizing curved leaf or plate springs for resisting inward movement of the friction wedges, said springs being held in proper positions by means of spring retainers preferably formed as flat plates bifurcated at their ends and said end portions bent in opposite directions to respectively overlie the ends of the springs.

Other objects and advantages of the invention relating to the particular arrangement and construction of the various parts will become apparent as the description proceeds.

Referring to the drawings illustrating my invention, the scope whereof is defined by the appended claims:

Figure 1 is a vertical longitudinal central section of one embodiment of my invention, the friction wedges and springs of the mechanism being shown in released position.

Figure 2 is a cross sectional view on the line 2—2 of Figure 1 looking in the direction of the arrows.

Figure 3 is a fragmentary plan of the embodiment of my invention shown in Figure 1, illustrated partly in section.

Figure 4 is a view corresponding to Figure 1 illustrating another embodiment of my invention.

Figure 5 is a half end elevation of my gear as indicated by the line 5—5 of Figure 4 looking in the direction of the arrows.

Referring to the drawings in detail, like parts being designated by like reference characters and first considering the embodiment of my invention illustrated in Figures 1, 2 and 3, there is shown a cushioning mechanism 1 especially adapted for use as a friction draft gear for railway cars and designed so that it will fit into a draft gear pocket of one of the smaller lengths. In the present embodiment, the gear together with its follower 2, may be made of a normal length equal to 18½ inches and be otherwise formed so as to interchange with standard gears of that length and may, if desired, have a travel of 2¾ inches. Although these dimensions are given for purposes of illustration, it is to be understood that I am not restricted to my invention embodied in a gear of any particular size. The follower 2, in the present embodiment, is shown as a rear follower although, as is obvious, my gear may be reversed if so desired. The gear 1 is particularly adapted for use with the usual type of Farlow attachments embodying a horizontal yoke, a front follower, a supporting key for said front follower and connecting the same with the draft sills and another key serving for connecting the yoke with the coupler. The aforementioned parts, in addition to the draft gear and rear follower, are not shown because they are parts of a usual form of draft rigging with which my draft gear may be used although, it will be understood, that my gear is adapted for use with other forms of draft parts or in other service, if desired.

The embodiment of my cushoning mechanism illustrated in Figures 1, 2 and 3 comprises a casing or spring barrel 3 closed at one end by a wall 4, although I do not wish to be limited to such construction, which end, in the present embodiment, is illustrated as the front end although, as is obvious, my gear is adapted to be used turned end to end, if desired. The open end of the gear has connected thereto an open-ended friction-developing or bell-mouthed portion 5, said portion being formed with connecting flanges or extensions 6 preferably interlocking or telescoping, with the engaging surfaces preferably inclined to provide a tight fit as shown in Figure 1, with the free edges of the spring barrel 3 and connected thereto in any desired manner as by means of rivets 7, said rivets being preferably countersunk as illustrated so that their heads do not project beyond the walls of the housing. The free end of the friction-developing portion 5 is preferably formed with a bell-mouthed part, that is, it is provided with outwardly diverging surfaces 9 adapted for developing frictional resistance therealong. These surfaces 9 may be set at an angle normally employed in friction gears of this character.

Cooperating with the friction surfaces 9 for developing the frictional resistance of the gear are a pair of wedge blocks 10 formed with cooperating similarly inclined friction surfaces 11 engaging the friction surfaces 9 on the bell-mouthed portion of the housing. Said blocks 10 are adapted for longitudinal movement with respect to said housing and friction-developing portion thereof and inward movement with respect to said housing is resisted, in the present embodiment, by a pair of sets of curved leaf or plate springs 12, said springs being disposed with their concave faces toward each other. For retaining said springs in position and preventing them from improperly alining with each other, a spring retainer 13 is provided, said retainer being preferably formed from a flat plate by slitting or bifurcating the ends as indicated at 14 and bending the portions 15 and 16 thereof in opposite directions to overlie the ends of the sets of curved leaf springs 12. Although the foregoing method of forming the spring retainer is disclosed as an economical and efficient way of making the spring retainer for my gear, it is obvious that I do not wish to be limited to such a construction as, if desired, other forms of retainers may be used with my gear and the ends of the retainer plate may be divided into more than two portions, alternately bent in opposite directions.

Preferably positioned between the inner ends of the wedge blocks 10 and the adjacent set of springs 12 is a follower 17, said follower serving to transmit force between the springs 12 and wedge blocks 10, whereby said wedge blocks are urged to their extreme outermost position as indicated in Figure 1. For preventing complete disengagement of said wedge blocks 10 from the spring barrel 3 and particularly the friction-developing portion 5 thereof, said wedge blocks are formed with outwardly extending ribs or flanges 18 positioned at the inner ends of said friction wedge blocks 10 and extending behind the shoulders 19 on the friction-developing portion 5 of the spring barrel formed by the discontinuance of the friction surfaces 9. These shoulders 19 are preferably curved as indicated and the connection between the ribs 18 and the friction wedge blocks 10 is preferably also curved for increasing the strength thereof.

Positioned between the wedge blocks 10 is resilient means for urging the same into engagement with the friction surface 9 of the spring barrel 3. Said resilient means, in the present embodiment, takes the form of curved leaf or plate springs 20 preferably formed in two sets disposed with their convex sides toward each other and, if desired, spaced by means of a liner or follower plate 21. These plate springs are properly positioned longitudinally by being held between the follower 17 and rear follower 2 and vertically by being positioned between the inner walls of the wedge blocks 10. For lightening the weight of said wedge blocks, the same may be cored out as indicated at 22 and a similar construction may be provided for the bell-mouthed portion 5.

Referring now to the embodiment of my invention illustrated in Figures 4 and 5, a construction very similar to that of the first embodiment is illustrated, that is, the gear comprises a spring barrel 3ª, a bell-mouthed or friction-developing portion 5ª, wedge blocks 10ª, spring plates 12ª resisting inward movement of said wedge blocks, spring retainers 13ª, a follower 17ª positioned between the inner ends of said wedge blocks and the adjacent set of springs 12ª and curved plate spring 20ª for urging said wedge blocks against the friction surfaces on the bell-mouthed portion 5ª. The difference between this gear or cushioning mechanism and that of the previous embodiment is, principally, that it is a longer gear adapted to have a slightly shorter travel. As illustrative of what dimensions may be given to this form of gear, it should be noted that said gear is particularly adapted to be formed with an overall dimension including the rear follower 2ª of 24⅝ inches so that it is adapted to interchange with other gears of such a length and fit in draft gear pockets of corresponding length. The gear in the present embodiment, although it may be designed to have a travel corresponding with that of the previous embodiment, is shown particularly designed to have a travel of 2½ inches. Although I have disclosed dimensions which may be employed in constructing my gear, it is to be understood that these dimensions are merely illustrative and that I am not restricted to using the same.

Another difference in this form of gear is that the top and bottom walls of the spring barrel 3ª are closer together than those of the first embodiment, thereby involving the use of shorter springs and making it desirable to increase the number of said sets of springs to maintain a corresponding resiliency. I, therefore, employ three sets of springs 12ª, said springs being disposed so that they alternately curve first one way and then the other, those springs disposed with their concave sides toward one another being retained in place by a spring retainer 13ª which may correspond in construction with the retainer 13 of the first embodiment or, if desired, formed of thicker material and lightened by being cut away at its central portion as indicated at 23. Between the sets of spring plates disposed with their convex portions toward each other, a follower 24 may be employed, if desired, said follower preferably taking the form illustrated, that is, being of reticulated or open construction for lightening the weight thereof. In the present embodiment, I also show the omission of the liner or follower plate between the sets of springs 20ª.

In order to form the overall dimension of this embodiment of my draft gear considerably longer than that of the previous embodiment without materially increasing the weight of the gear or involving any extra attachments for use therewith, the closed end of said casing or housing 3ª is extended, thereby forming a hollow portion 25 which serves merely as a lengthener for the spring barrel or housing. This extension is preferably rigidified by a web 26 extending between the rear wall 4ª, the top and bottom walls and transverse inward extensions, flanges or webs 27 upon which the ends of the inner set of springs 12ª abut. Except as specifically described in connection with the second embodiment of my invention, the same may correspond substantially with the first embodiment.

The operation of my gear is as follows: When force is applied thereon, for example either buffing or draft force, relative movement is effected between the casing and the rear follower, thereby first causing the wedge blocks to move inwardly with respect to said casing, straightening the springs resisting said movement as will be understood and developing friction between said wedge blocks and the bell-mouthed portion of the gear. When the gear is released, the wedges will move outwardly to normal released position as indicated. From the foregoing, it will be apparent that, in the first embodiment, the spring retainer 13 functions as a follower and, in the second embodiment, in addition to the retainer 13ª, the follower 24 is provided. On account of the built-up construction of the spring plate housing, the bell-mouthed or friction-developing portion thereof is adapted to interchange with barrel portions of various lengths to produce gears of different lengths as will be understood.

Not only may this friction-developing portion interchange for gears of different lengths but also for gears of different amounts of travel. With gears having slightly different amounts of travel, the only change necessary is that the wedge blocks be correspondingly altered to provide the desired amount of travel. For example, in changing from 2¾ inch travel to 2½ inch travel, the wedge blocks may be maintained of uniform length, depth, width and inclination of the friction surface, the only difference being that said friction surface is correspondingly moved and the longitudinal dimension of the retaining flange or rib changed to correspond. For example, the change in the rib designated by the reference character 18 in Figure 1 to provide a gear having a decrease of travel from 2¾ to 2½ inches is an increase in longitudinal dimension of ¼ inch.

In accordance with my invention, therefore, I am enabled to construct draft gears of various lengths and various amounts of travel while, at the same time, minimizing the cost of patterns for gears by standardizing the parts thereof which may be made interchangeable, whereby the maximum number of identical parts for making gears of different lengths and travels may be employed. A further advantage of my invention resides in the fact that when the separable bell-mouthed portions of my spring housings or casings are worn out in service, they may be removed and replaced by new portions without scrapping the whole spring barrel. It will be apparent that I have also devised an efficient and economically constructed spring retainer and that, by providing for increasing the gear by a hollow extension thereon, I have obviated the necessity of using such a gear in a longer pocket with auxiliary attachments such as an extra follower or follower of abnormal length, thereby minimizing the weight of the complete draft rigging.

Although preferred embodiments of my invention have been illustrated, it will be understood that modifications may be made within the scope of the appended claims and that the terms and expressions which I have employed are used as those of description and not of limitation.

Having now described my invention, I claim:

1. A cushioning mechanism comprising a casing open at one end, a bell mouthed extension connected to said open end and providing inclined friction surfaces, the other end being formed with a spring containing portion and a hollow extension beyond and separated from said spring containing portion, by inward extensions on the casing, for filling up the space provided in the associated draft gear pocket, wedge blocks slidable longitudinally with respect to said casing between the inclined friction surfaces and formed with complementary friction surfaces engaging said first mentioned surfaces, spring means engaging said extensions and positioned in said spring containing portion of the casing for resisting movement of the wedge blocks inwardly thereof and springs disposed between the wedge blocks to urge the same against the first mentioned friction surfaces.

2. A cushioning mechanism comprising a spring barrel open at one end, a separately formed extension on said open end connected thereto, said extension being formed with outwardly diverging friction surfaces, wedge blocks positioned between said surfaces and formed with complementary friction surfaces, said wedge blocks being longitudinally slidable with respect to said spring barrel, plate springs positioned transversely in said barrel for resisting movement of the wedge blocks inwardly thereof, said spring plates being arranged as a plurality of sets of springs, one set of springs being oppositely curved from the adjacent set and a pair of sets being properly positioned in the barrel by spring retainers positioned therebetween and formed with flanges first extending in one direction, then in the opposite direction, and respectively overlapping the corresponding edges of said springs and resilient means positioned between said wedge blocks to urge the same against the friction surfaces on the spring barrel extension.

3. A cushioning mechanism comprising a spring barrel open at one end only, a separately formed extension securely connected to the open end thereof, said extension being formed with outwardly diverging friction surfaces, wedge blocks positioned between said friction surfaces and movable longitudinally with respect to said spring barrel, outwardly extending portions on said wedge blocks interlocking with corresponding portions on said extension to normally prevent complete removal of said wedge blocks curved spring plates disposed in said spring barrel to resist inward movement of said wedge blocks, said spring plates being formed as sets of springs, each set being curved oppositely with respect to its adjacent set, followers positioned between each set of springs and between the outermost set of springs and the wedge blocks, the follower between the sets of springs concave toward each other being formed with spring retaining flanges alternately oppositely disposed along the edges thereof to respectively overlap the ends of said sets of springs, and curved spring plates longitudinally disposed and positioned between said wedge blocks to urge the same against the first mentioned friction surfaces.

4. A cushioning mechanism comprising a casing with an extension interlocked with and connected to the casing, and formed with a plurality of sets of inclined friction surfaces, wedge blocks slidable longitudinally in said casing and formed with complementary inclined friction surfaces engaging said surfaces on the casing outwardly extending portions on said wedge blocks interlocking with corresponding portions on said extension to normally prevent complete removal of said wedge blocks, curved spring plates disposed in said casing to resist inward movement of said wedge blocks, said spring plates being formed as sets of springs, each set being curved oppositely with respect to its adjacent set, followers positioned between each set of springs and between the outermost set of springs and the wedge blocks, the follower between the sets of springs concave toward each other being formed with spring retaining flanges alternately oppositely disposed to respectively overlap the ends of one set of springs, for a predetermined distance and then the ends of the set of springs on the opposite side of said follower for the remainder of flanged edges, whereby said follower may be formed in one piece by slitting and bending a flat plate and curved spring plates longitudinally disposed and positioned between said wedge blocks to urge the same against the first mentioned friction surfaces.

5. A retaining device for curved plate springs comprising a flat plate formed at each end thereof with portions bent over to form flanges, the flanges being alternately directed to opposite sides of said plate and the flange at each end directed one way being laterally offset from that directed the other way.

6. A casing for cushioning mechanism open at one end, and means extending from the inner surfaces of the walls of said casing and rigid therewith to permanently divide it into a length adjusting portion and a resilient means receiving portion, said dividing means being adapted to serve for the support of said resilient means.

7. A casing for cushioning mechanism open at one end, the other end being extended to a desired length so that the mechanism will fit in a draft gear pocket without the necessity of auxiliary filler means, said casing being formed with inwardly extending flanges separating the extension from the mechanism receiving portion and serving as stops for said mechanism.

8. A spring barrel for cushioning mechanism open at one end, and a friction developing element associated therewith and having outwardly diverging friction surfaces and inwardly extending flanges, said flanges telescoping with the free edges of the spring barrel with the engaging surfaces inclined to provide a tight fit, and means rigidly connecting said flanges to said edges.

9. A cushioning mechanism comprising a casing open at one end, the other end being divided, by inward extensions on the casing, into a spring containing portion and a hollow extension beyond said spring containing portion for filling up the space provided in an associated draft gear pocket without the necessity of using an auxiliary element, and springs enclosed in said spring containing portion and engaging said extensions.

10. A retaining device for curved plate springs formed with a relatively flat body portion, and flanges at a pair of opposite edges thereof, said flanges first extending in one direction and then in the opposite direction and offset laterally with respect to one another.

11. A retaining device for curved plate springs comprising a body portion with retaining flanges alternately oppositely disposed along a pair of opposite edges thereof, each flange being of less width than the body portion.

12. A retaining device for curved plate springs comprising a plate with spring retaining flanges alternately oppositely disposed along a pair of opposite edges so as to overlap the ends of one set of springs for a predetermined distance, and then the ends of aother set of springs on the opposite side thereof for the remainder of the flanged edges.

13. A cushioning device comprising a casing formed with walls and open at one end, cushioning mechanism including spring means disposed therein, said casing having means integral with, and extending inwardly from the inner surfaces of, said walls, to provide abutments engaged by said spring means, said casing being continued as an empty extension beyond said abutments to a desired length so that the device will fit in a draft gear pocket without the necessity of auxiliary filler means.

In testimony whereof I affix my signature.
DONALD S. BARROWS.